(12) United States Patent
Nourbakhsh et al.

(10) Patent No.: US 11,886,408 B2
(45) Date of Patent: Jan. 30, 2024

(54) SYSTEM AND METHOD FOR AUTOMATED EXTRACTION AND STANDARDIZATION OF FINANCIAL TIME-SERIES DATA FROM SEMI-STRUCTURED TABULAR INPUT

(71) Applicant: JPMorgan Chase Bank, N.A., New York, NY (US)

(72) Inventors: Armineh Nourbakhsh, Pittsburgh, PA (US); Sameena Shah, Scarsdale, NY (US); Maria Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 84 days.

(21) Appl. No.: 17/596,038

(22) PCT Filed: Apr. 29, 2021

(86) PCT No.: PCT/US2021/029868
§ 371 (c)(1),
(2) Date: Dec. 2, 2021

(87) PCT Pub. No.: WO2022/231593
PCT Pub. Date: Nov. 3, 2022

(65) Prior Publication Data
US 2022/0365916 A1 Nov. 17, 2022

(51) Int. Cl.
*G06F 16/22* (2019.01)

(52) U.S. Cl.
CPC ........ *G06F 16/221* (2019.01); *G06F 16/2228* (2019.01); *G06F 16/2282* (2019.01)

(58) Field of Classification Search
CPC ...... G06F 40/103; G06F 40/40; G06F 16/221; G06F 16/2282
USPC ......................................................... 707/741
See application file for complete search history.

(56) References Cited

U.S. PATENT DOCUMENTS

2013/0232157 A1* 9/2013 Kamel .................. G06F 16/215
707/755

OTHER PUBLICATIONS

International Search Report and Written Opinion in corresponding International Application No. PCT/US2021/29868, dated Aug. 4, 2021.

\* cited by examiner

*Primary Examiner* — Hung T Vy
(74) *Attorney, Agent, or Firm* — GREENBLUM & BERNSTEIN, P.L.C.

(57) ABSTRACT

A method and a system for extracting and formatting financial time-series data is provided. The method includes: receiving a first set of tabular data; segmenting the first set of tabular data into a plurality of cells; determining whether each respective cell is a header cell or a content cell; for each header cell, normalizing each of a time period and a metric associated therewith; for each content cell, determining one or more column header cells and one or more row header cells associated. therewith; and generating an output table based on a result thereof.

22 Claims, 8 Drawing Sheets

…

SYSTEM AND METHOD FOR AUTOMATED EXTRACTION AND STANDARDIZATION OF FINANCIAL TIME-SERIES DATA FROM SEMI-STRUCTURED TABULAR INPUT

BACKGROUND

1. Field of the Disclosure

This technology generally relates to methods and systems for retrieving financial data from a table, and more particularly to methods and systems for automated extraction of financial time-series data from a semi-structured tabular input and conversion of the data into a unified standard format.

Background Information

Tabular structures house massive amounts of data. In an enterprise setting, the diversity and variety of these structures may make it difficult to standardize, analyze, compare, and/or unify them. Often, technology teams build custom pre-processing pipelines that can transform and standardize a limited subset of these datasets. However, these pipelines are rarely useful for other datasets having different formats and structures. Such efforts, when repeated for each individual dataset, business unit, and function, may prove to be quite costly.

Accordingly, there is a need for a method for automatically extracting and standardizing such data into a unified standard format that is reusable in any downstream pipeline.

SUMMARY

The present disclosure, through one or more of its various aspects, embodiments, and/or specific features or sub-components, provides, inter alia, various systems, servers, devices, methods, media, programs, and platforms for automated extraction of financial time-series data from a semi-structured tabular input and conversion of the data into a unified standard format.

According to an aspect of the present disclosure, a method for automated extraction of financial time-series data from a semi-structured tabular input and conversion of the data into a unified standard format is provided. The method is implemented by at least one processor. The method includes: receiving, by the at least one processor, a first set of tabular data; segmenting, by the at least one processor, the first set of tabular data into a plurality of cells; determining, by the at least one processor for each respective cell of the plurality of cells, whether the respective cell is a header cell or a content cell; for each respective cell determined to be a header cell, normalizing each of a time period and a metric associated with the respective header cell; for each respective cell determined to be a content cell, determining, from among the plurality of cells determined to be header cells, at least one column header cell and at least one row header cell associated with the respective content cell; and generating an output table based on a result of the determining of the corresponding at least one column header cell and the corresponding at least one row header cell associated with each respective content cell.

The determining of whether the respective cell is a header cell or a content cell may include: when the respective cell contains at least one from among text and date information, determining that the respective cell is a header cell; and when the respective cell contains only numerical information, determining that the respective cell is a content cell.

The normalizing of the time period associated with the respective header cell may include determining a starting date and an ending date associated with the respective header cell.

The determining of the starting date and the ending date associated with the respective header cell may include using a dateparser python library to identify at least one date-like expression contained in the respective header cell.

The normalizing of the metric associated with the respective header cell may include determining at least one from among a value type, a value scale, and a value designation for each numerical value associated with the respective header cell.

The value type may include at least one from among a currency, a percentage, a ratio, a scaled number, a scale-free cardinal number, and a scale-free ordinal number.

The value scale may include order of magnitude information that corresponds to each numerical value associated with the respective header cell.

The value designation may include descriptive information that corresponds to each numerical value associated with the respective header cell.

The first set of tabular data may include at least one from among a Microsoft Excel workbook file that contains at least one spreadsheet, a comma-delimited tabular file, and a tab-delimited tabular file.

The generating of the output table may include at least one from among generating a tab-delimited file and generating a JavaScript Object Notation (JSON) object.

The method may further include determining, for each respective content cell, a corresponding hierarchy of metrics, According to another exemplary embodiment, a computing apparatus for extracting and formatting financial time-series data is provided. The computing apparatus includes a processor; a memory; and a communication interface coupled to each of the processor and the memory. The processor is configured to: receive, via the communication interface, a first set of tabular data; segment the first set of tabular data into a plurality of cells; determine, for each respective cell of the plurality of cells, whether the respective cell is a header cell or a content cell; for each respective cell determined to be a header cell, normalize each of a time period and a metric associated with the respective header cell; for each respective cell determined to be a content cell, determine, from among the plurality of cells determined to be header cells, at least one column header cell and at least one row header cell associated with the respective content cell; and generate an output table based on a result of the determining of the corresponding at least one column header cell and the corresponding at least one row header cell associated with each respective content cell.

The processor may be further configured to: when the respective cell contains at least one from among text and date information, determine that the respective cell is a header cell; and when the respective cell contains only numerical information, determine that the respective cell is a content cell.

The processor may be further configured to normalize the time period associated with the respective header cell by determining a starting date and an ending date associated with the respective header cell.

The processor may be further configured to determine the starting date and the ending date associated with the respective header cell by using a dateparser python library to identify at least one date-like expression contained in the respective header cell.

The processor may be further configured to normalize the metric associated with the respective header cell by determining at least one from among a value type, a value scale, and a value designation for each numerical value associated with the respective header cell.

The value type may include at least one from among a currency, a percentage, a ratio, a scaled number, a scale-free cardinal number, and a scale-free ordinal number.

The value scale may include order of magnitude information that corresponds to each numerical value associated with the respective header cell.

The value designation may include descriptive information that corresponds to each numerical value associated with the respective header cell.

The first set of tabular data may include at least one from among a Microsoft Excel workbook file that contains at least one spreadsheet, a comma-delimited tabular file, and a tab-delimited tabular file.

The processor may be further configured to generate at least one from among a tab-delimited file and a JavaScript Object Notation (JSON) object as the output table.

The processor may further be configured to determine, for each respective content cell, a corresponding hierarchy of metrics.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 is a screenshot of a user interface showing an example of spreadsheet data being inputted for processing using a method for automated extraction of financial time-series data from a semi-structured tabular input and conversion of the data into a unified standard format, according to an exemplary embodiment.

FIG. 8 is a screenshot of the user interface showing an example of an output generated by using a method for automated extraction of financial time-series data from a semi-structured tabular input and conversion of the data into a unified standard format, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
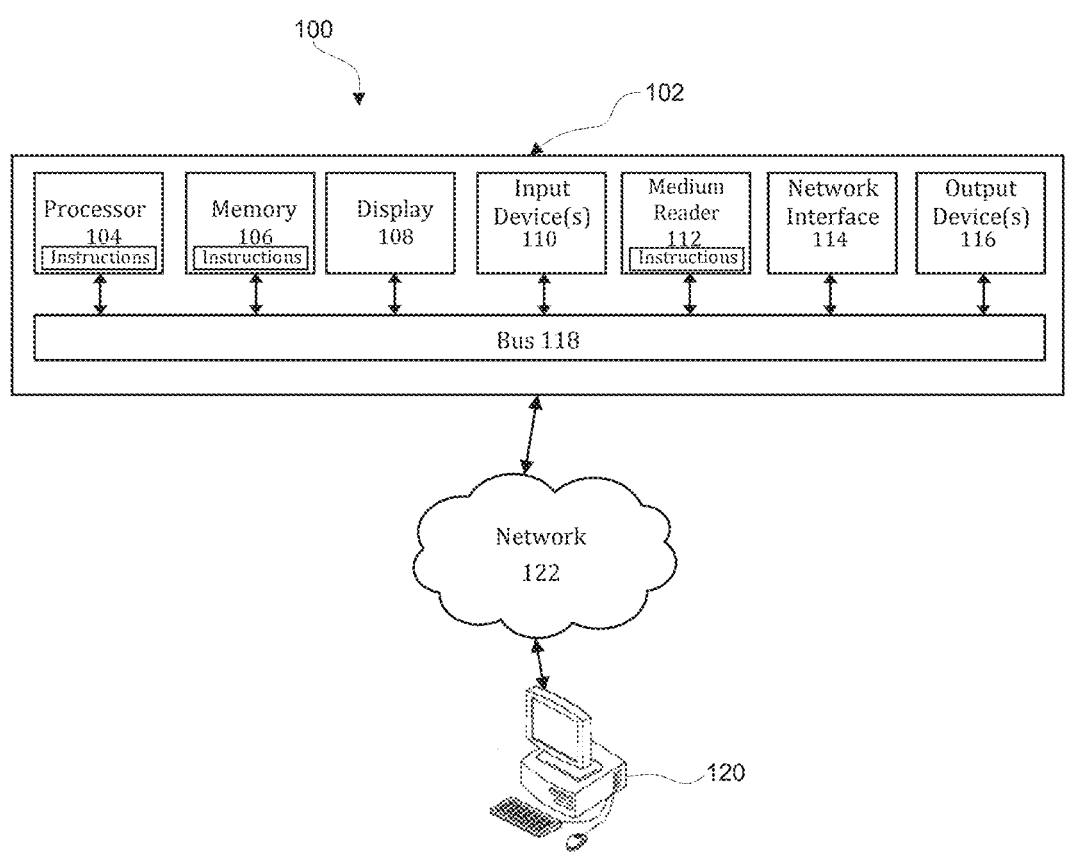
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus, Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automated extraction of financial time-series data from a semi-structured tabular input and conversion of the data into a unified standard format.

Figure 2:
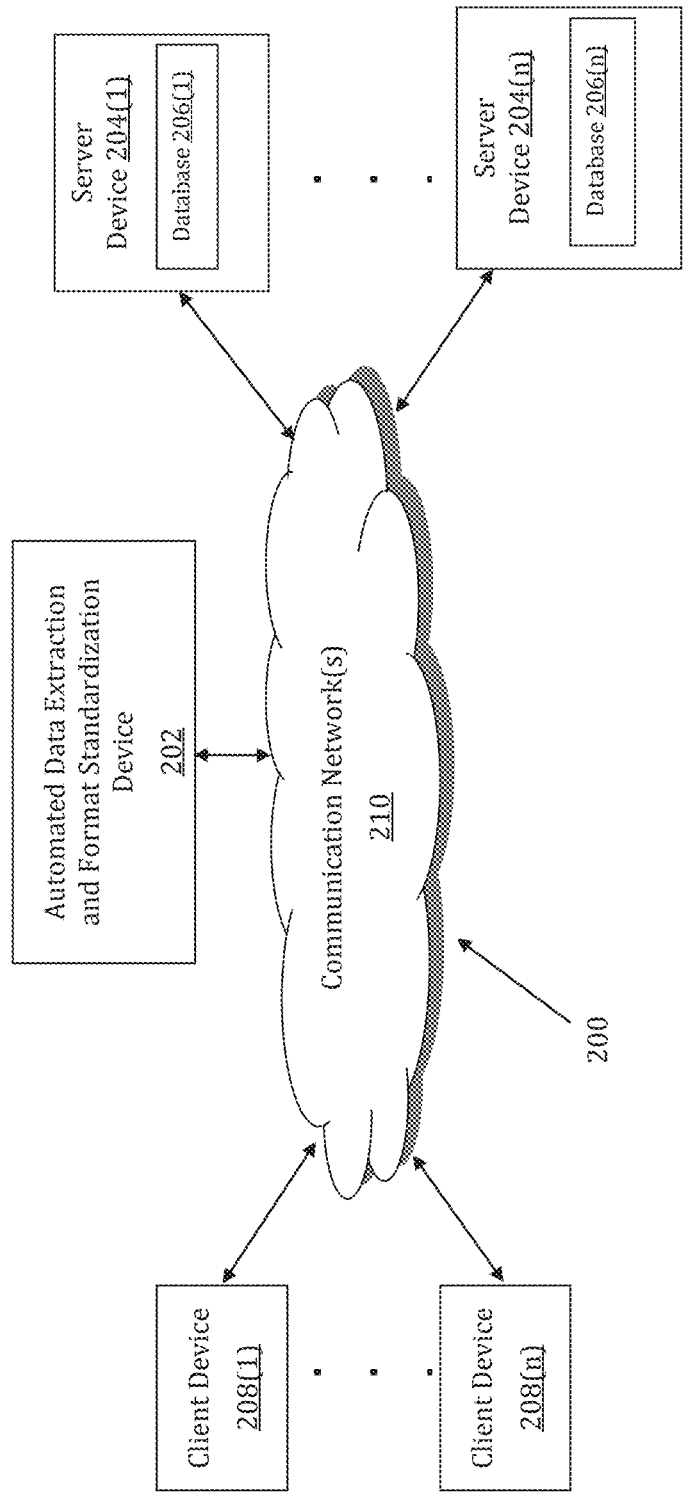
FIG. 2 illustrates an exemplary diagram of a network environment.

Referring to FIG. 2, a schematic of an exemplary network environment 200 for implementing a method for automated extraction of financial time-series data from a semi-structured tabular input and conversion of the data into a unified standard format is illustrated. In an exemplary embodiment, the method is executable on any networked computer platform, such as, for example, a personal computer (PC).

The method for automated extraction of financial time-series data from a semi-structured tabular input and conversion of the data into a unified standard format may be implemented by an Automated Data Extraction and Format Standardization (ADEFS) device 202. The ADEFS device 202 may be the same or to the computer system 102 as described with respect to FIG. 1. The ADEFS device 202 may store one or more applications that can include executable instructions that, when executed by the ADEFS device 202, cause the ADEFS device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ADEFS device 202 itself, may be located in virtual server(s) running in a cloud-based computing environment rather than being tied to one or more specific physical network computing devices. Also, the application(s) may be running in one or more virtual machines (VMs) executing on the ADEFS device 202. Additionally, in one or more embodiments of this technology, virtual machine(s) running on the ADEFS device 202 may be managed or supervised by a hypervisor.

In the network environment 200 of FIG. 2, the ADEFS device 202 is coupled to a plurality of server devices 204(1)-204(n) that hosts a plurality of databases 206(1)-206(n), and also to a plurality of client devices 208(1)-208(n) via communication network(s) 210. A communication interface of the ADEFS device 202, such as the network interface 114 of the computer system 102 of FIG. 1, operatively couples and communicates between the ADEFS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADEFS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ADEFS devices that efficiently implement a method for automated extraction of financial time-series data from a semi-structured tabular input and conversion of the data into a unified standard format.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ADEFS device 202 may be a standalone device or integrated with one or more other devices or apparatuses, such as one or more of the server devices 204(1)-204(n), for example. In one particular example, the ADEFS device 202 may include or be hosted by one of the server devices 204(1)-204(n), and other arrangements are also possible. Moreover, one or more of the devices of the ADEFS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used, The server devices 204(1)-204(n) in this example may process requests received from the ADEFS device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store semi-structured financial time-series data from disparate sources and format standardization data that relates to converting input data into a unified standard format.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ADEFS device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ADEFS device 202 via the communication networks) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ADEFS device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADEFS device 202, the server devices 204(1)-204(n), or the client devices 208(1)-208(n), for example, may be configured to operate as virtual instances on the same physical machine. In other words, one or more of the ADEFS device 202, the server devices 204(1)-204(n), or the client devices 208(1)-208(n) may operate on the same physical device rather than as separate devices communicating through communication network(s) 210. Additionally, there may be more or fewer ADEFS devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
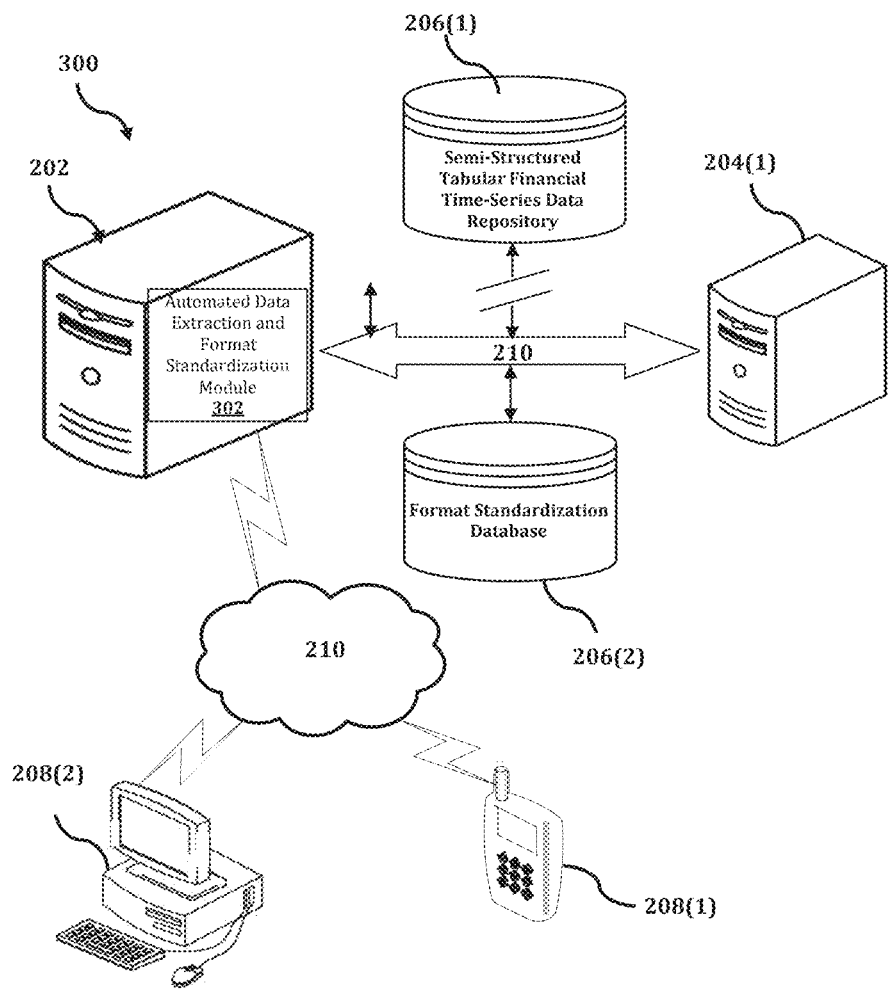
FIG. 3 shows an exemplary system for implementing a method for automated extraction of financial time-series data from a semi-structured tabular input and conversion of the data into a unified standard format.

The ADEFS device 202 is described and illustrated in FIG. 3 as including an automated data extraction and format standardization module 302, although it may include other rules, policies, modules, databases, or applications, for example. As will be described below, the automated data extraction and format standardization module 302 is configured to implement a method for automated extraction of financial time-series data from a semi-structured tabular input and conversion of the data into a unified standard format.

An exemplary process 300 for implementing a mechanism for automated extraction of financial time-series data from a semi-structured tabular input and conversion of the data into a unified standard format by utilizing the network environment of FIG. 2 is illustrated as being executed in FIG. 3. Specifically, a first client device 208(1) and a second client device 208(2) are illustrated as being in communication with ADEFS device 202. In this regard, the first client device 208(1) and the second client device 208(2) may be "clients" of the ADEFS device 202 and are described herein as such. Nevertheless, it is to be known and understood that the first client device 208(1) and/or the second client device 208(2) need not necessarily be "clients" of the ADEFS device 202, or any entity described in association therewith herein. Any additional or alternative relationship may exist between either or both of the first client device 208(1) and the second client device 208(2) and the ADEFS device 202, or no relationship may exist.

Further, ADEFS device 202 is illustrated as being able to access a semi-structured tabular financial time-series data repository 206(1) and a format standardization database 206(2). The automated data extraction and format standardization module 302 may be configured to access these databases for implementing a method for automated extraction of financial time-series data from a semi-structured tabular input and conversion of the data into a unified standard form at.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ADEFS device 202 via broadband or cellular communication. Of course, these embodiments are merely exemplary and are not limiting or exhaustive.

Upon being started, the automated data extraction and format standardization module 302 executes a process for automated extraction of financial time-series data from a semi-structured tabular input and conversion of the data into a unified standard format. An exemplary process for automated extraction of financial time-series data from a semi-structured tabular input and conversion of the data into a unified standard format is generally indicated at flowchart 400 in FIG. 4.

Figure 4:
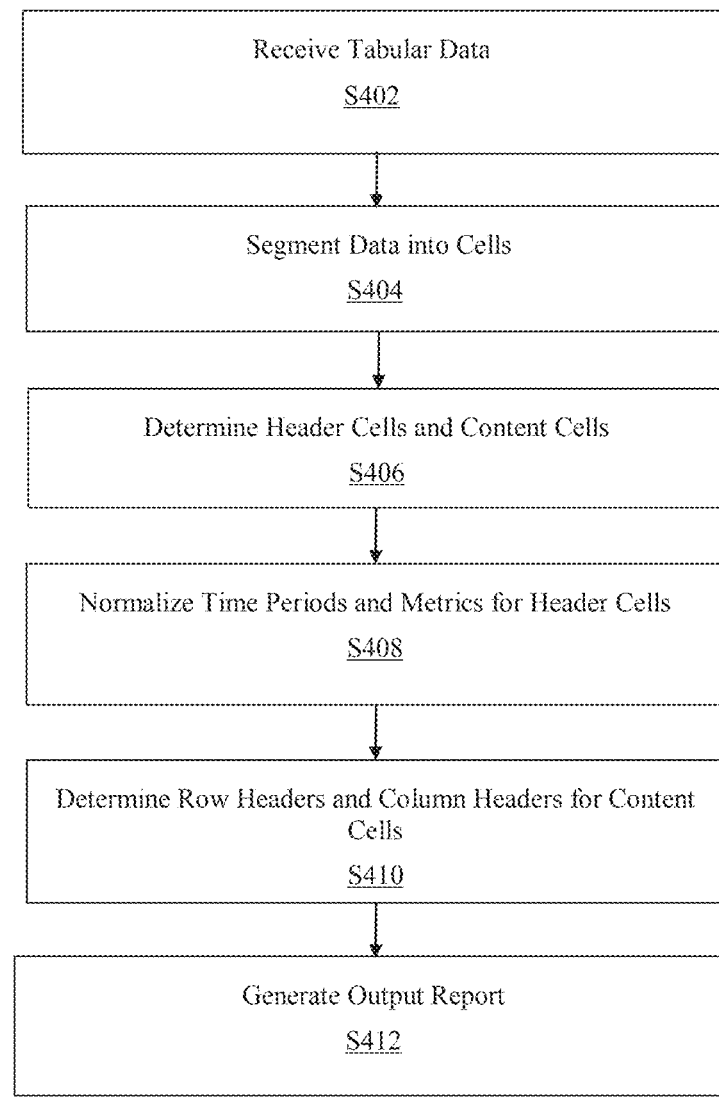
FIG. 4 is a flowchart of an exemplary process for implementing a method for automated extraction of financial time-series data from a semi-structured. tabular input and conversion of the data into a unified standard format.

In process 400 of FIG. 4, at step S402, the automated data extraction and format standardization module 302 receives a first set of tabular data. The tabular data may include a Microsoft Excel workbook file that contains at least one spreadsheet. Alternatively, the tabular data may include a comma-delimited tabular file and/or a tab-delimited tabular file. In an exemplary embodiment, the first set of tabular data may include many spreadsheets and/or many MS Excel files.

At step S404, the automated data extraction and format standardization module 302 segments the tabular data into cells. Then, at step S406, the automated data extraction and format standardization module 302 determines, on a cell-by-cell basis, whether each respective cell is a header cell or a content cell. In an exemplary embodiment, when a particular cell contains text and/or date information, then that particular cell may be determined as being a header cell; and conversely, when a particular cell contains only numerical information, then that particular cell may be determined as being a content cell.

At step S408, the automated data extraction and format standardization module 302 normalizes time periods and/or metrics for each header cell. In an exemplary embodiment, the normalization of a time period for a particular header cell entails determining a starting date and an ending date that are associated with the particular header cell. This may be executed by using a dateparser python library to identify at least one date-like expression contained in the particular header cell.

In an exemplary embodiment, the normalization of a metric for a particular header cell entails determining any one or more of a value type, a value scale, and a value designation. The value type may include any one or more of a currency, a percentage, a ratio, a scaled number, a scale-free cardinal number, and a scale-free ordinal number.

The value scale may include order of magnitude information that corresponds to a numerical value associated with a particular cell. For example, the value scale may indicate that a particular value is in hundreds, thousands, millions, billions, or any other suitable order of magnitude. The value designation may include descriptive information that corresponds to the numerical value associated with the particular cell. For example, the value designation may indicate a unit of measure, such as, for example, U.S. dollars (USD or $), and/or a description that a particular value is an actual value, a projected value, an expected value, and/or any other suitable descriptor.

At step S410, the automated data extraction and format standardization module 302 determines one or more row headers and one or more column headers for each content cell. In an exemplary embodiment, the automated data extraction and format standardization module 302 may also determine a hierarchy of metrics for each content cell, i.e., an ordered sequence of metrics that describes the content of the respective cell. Then, at step S412, the automated data extraction and format standardization module 302 generates an output report based on the determined arrangement of cells. In an exemplary embodiment, the output table may include a JavaScript Object Notation (JSON) object and/or a tab-delimited file.

A method for automated standardization of tabular data into a unified standard format than can be reused in any downstream pipeline is disclosed. In an exemplary embodiment, the method works on three conditions: 1) The data is numeric/quantitative; 2) Each datapoint reflects the value of a metric or a set of metrics; and 3) each datapoint is tied to a period of time.

Referring to Table 1 below: The top segment of Table 1 provides two examples of such tabular data. The top-left input table includes employment data from a hypothetical state, and the top-right input table includes financial data from a hypothetical company. In each input table, there are header cells that include data that relates to a period of time, header cells that include metric data, and content cells that include numeric data. The middle table is a normalized version of the top-left input table, and the bottom table is a normalized version of the top-right input table. Other examples of such datasets include financial earnings reports, market data, credit card transactions, budget reports, macroeconomic insights, and most other financial time-series datasets.

TABLE 1

Examples to Illustrate Normalization of Tabular Data

State X data

| Year | Month | labor force | Employment |
|---|---|---|---|
| 2009 | January | 6,608,305 | 6,057,455 |
| 2009 | February | 6,616,877 | 6,027,328 |
| 2009 | March | 6,628,347 | 6,003,114 |

Consolidated statements of income (USD $ in Million)

| | | 9 Months Ended | | |
|---|---|---|---|---|
| | | Sep. 30, 2020 | | Sep. 30, 2019 |
| | Revenue | Actual | Expected | Actual |
| | IB fees | 2,187 | 2,050 | 1,967 |
| | Principal transactions | 4,142 | 4,200 | 5,449 |
| $m^1$ | $m^2$ | 2009 Jan. 1 to 2009 Feb. 1 | 2009 Feb. 1 to 2009 Mar. 1 | 2009 Mar. 1 to 2009 Apr. 1 ct    cs  Cg |

TABLE 1-continued

Examples to Illustrate Normalization of Tabular Data

| | | | | | | | | |
|---|---|---|---|---|---|---|---|---|
| State X data | labor force | 6,608,305 | 6,616,877 | 6,628,347 | cardinal | | 1 | actual |
| State X data | employment | 6,057,455 | 6,027,328 | 6,003,114 | cardinal | | 1 | actual |

| $m^1$ | $m^2$ | $m^3$ | 2019 Jan. 1 to 2019 Sep. 30 | 2020 Jan. 1 to 2020 Sep. 30 | ct | cs | cg |
|---|---|---|---|---|---|---|---|
| Consolidated statements of income | Revenue | IB fees | 1,967 | 2,187 | currency (USD) | 1000000 | actual |
| Consolidated statements of income | Revenue | IB fees | | 2,050 | currency (USD) | 1000000 | expected |
| Consolidated statements of income | Revenue | Principal transactions | 5,449 | 4,142 | currency (USD) | 1000000 | actual |
| Consolidated statements of income | Revenue | Principal transactions | | 4,200 | currency (USD) | 1000000 | expected |

Problem Statement: The representations of the input (tabular data) and the output (standardized format) must be formalized. The tabular input is modeled as an I×J matrix. Let $d_{ij}$ be a non-empty datapoint at cell position (i, j), which may be represented $d_{ij}$ by a 4-tuple ($v_{ij}$, $c_{ij}$, $m_{ij}$, $p_{ij}$), where: 1) $v_{ij}$ is the values of the datapoints, e.g. "2,187"; 2) $c_{ij}$ stands for the content of the datapoint, and is itself a triple ($ct_{ij}$, $cs_{ij}$, $cg_{ij}$), which represents the type, scale, and designation of the content, e.g. ("currency (USD)", "1,000,000", "forecast"); 3) $m_{ij}$ is an ordered sequence $[m^1_{ij} \to m^2_{ij} \to \ldots m^k_{ij}]$ which represents a hierarchy of metrics, e.g. ["Revenue" "Non-interest Revenue"]; and 4) $p_{ij}$ is a tuple ($ps_{ij}$, $pe_{ij}$) which represents a period with a start and an end, e.g. ("2020 Dec. 1 00:00:00", "2021 Jan. 1 00:00:00").

Based on the above, two datapoints can be joined horizontally if they share the same metric sequence, but their periods differ. In other words:

$$hjoin(d_{ij}, d_{i'j'}) \Leftrightarrow (c_{ij} = c_{i'j'}) \wedge (m_{ij} = m_{i'j'}) \wedge$$
$$(ps_{ij} = ps_{i'j'} + \delta) \wedge (pe_{ij} = pe_{i'j'} + \delta) \wedge (pe_{ij} = pe_{i'j'})$$

Additionally, two datapoints can be joined vertically if they have identical periods, and their metric sequence differs only at the lowest level. In other words:

$$vjoin(d_{ij}, d_{i'j'}) \Leftrightarrow (c_{ij} = c_{i'j'}) \wedge (p_{ij} = p_{i'j'}) \wedge$$
$$(|m_{ij}| = |m_{i'j'}| = k) \wedge (\forall_{x \in \{i,\ldots k-1\}} m^x_{ij} = m^x_{i'j'}) \wedge (m^k_{ij} \neq m^k_{i'j'})$$

In an exemplary embodiment, conjoined datapoints can be represented as synthetic datapoints, and the joining process can be iteratively applied so other cells join them. As shown in Table 1 above, this will eventually produce a panel which horizontally extends into a time-series and vertically extends into a list of comparable metrics. A single spreadsheet might produce multiple panels, each at different levels of sub-metric grouping and with different unit time-steps δ.

Figure 5:
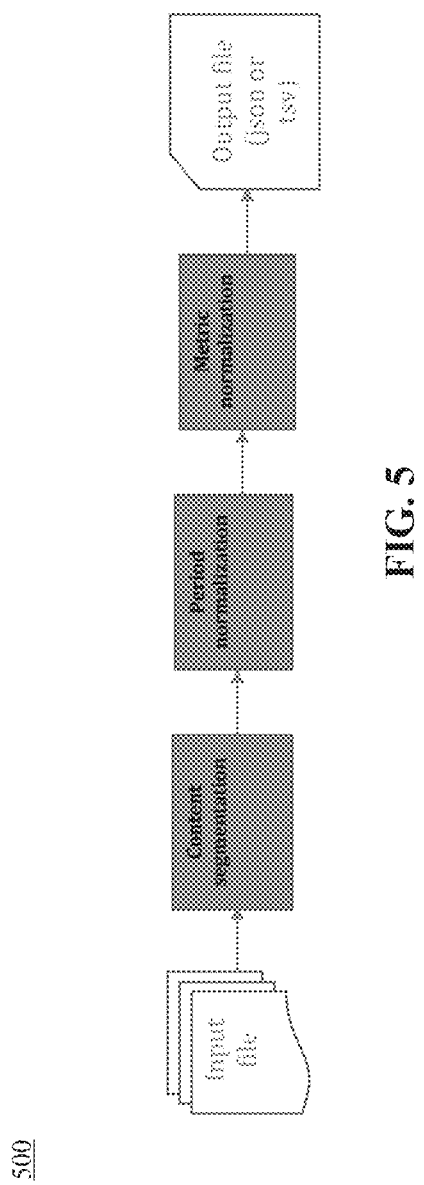
FIG. 5 is a data flow diagram of a pipeline for implementing a method for automated extraction of financial time-series data from a semi-structured tabular input and conversion of the data into a unified standard format, according to an exemplary embodiment.

FIG. 5 is a data flow diagram 500 of a pipeline for implementing a method for automated extraction of financial time-series data from a semi-structured tabular input and conversion of the data into a unified standard format, according to an exemplary embodiment. When a user supplies the tool with a tabular data file such as a MS Excel Spreadsheet, the file is processed through three separate modules: a content segmentation module, a period normalization module, and a metric normalization module.

Content Segmentation: In an exemplary embodiment, this module processes the input file, and for each cell in the input, the module identifies the corresponding column and row headers. The input file can be composed of multiple spreadsheets, and each spreadsheet can have more than one table on it. Instead of employing a table-boundary-identification algorithm that might prove brittle, a table-agnostic approach is followed. The module relies on two assumption: 1) the non-header datapoints are numerical; and 2) the headers are likely to be placed in the top and left corners of each table.

Based on these assumptions, the module follows the below algorithm: First: For each cell in the input, determine if the cell can be a potential header. In an exemplary embodiment, this is determined by whether the cell contains text or date-like content. Being date-like may be determined either by the native format of the cell, or by using the dateparser python library. In Table 2 below, the header cells are shown at the top and left-hand portions of the table, and each includes text and/or date-like content, and the non-header cells are shown in the bottom two rows and in the three right-most columns, and each includes only numerical data.

TABLE 2

| Consolidated statements of income (USD $ in Million) | | | |
|---|---|---|---|
| | 9 Months Ended | | |
| | Sep. 30, 2020 | | Sep. 30, 2019 |
| Revenue | Actual | Expected | Actual |
| IB fees | 2,187 | 2,050 | 1,967 |
| Principal transactions | 4,142 | 4,200 | 5,449 |

Second: For each header cell, propagate values to subordinate cells. Subordinate cells are identified in two ways: 1)

If a cell is merged and spans multiple sub-cells, then cells aligned with the sub-cells are considered subordinates. 2) If a cell has higher-level stylistic elements (e.g., boldface font, large font, headline-style font, colored background) than the cell immediately to its right or bottom, then the right or bottom cell is considered subordinate. Table 3 below shows an example of how Table 2 may be processed such that headers are propagated to subordinate cells:

TABLE 3

| | Consolidated statements of income (USD $ in Million) | | |
|---|---|---|---|
| | Consolidated statements of income | | |
| | (USD $ in Million) → 9 Months Ended | | |
| | Consolidated statements of income | Consolidated statements of income | |
| | (USD $ in Million) → 9 Months Ended → Sep. 30, 2020 | (USD $ in Million) → 9 Months Ended → Sep. 30, 2019 | |
| Consolidated statements of income (USD $ in Million) → Revenue | Consolidated statements of income (USD $ in Million) → 9 Months Ended → Sep. 30, 2020 → Actual | Consolidated statements of income (USD $ in Million) → 9 Months Ended → Sep. 30, 2020 → Expected | 9 Consolidated statements of income (USD $ in Million) → Months Ended → Sep. 30, 2020 → Actual |
| Consolidated statements of income (USD $ in Million) → Revenue → IB fees | 2,187 | 2,050 | 1,967 |
| Consolidated statements of income (USD $ in Million) → Revenue → Principal transactions | 4,142 | 4,200 | 5,449 |

Third: All non-header cells are considered content cells. For each content cell, assign its value to a new $d_{ij}$ object, where i and j are the row and column index of the cell, respectively.

Fourth: For each $d_{ij}$ object, find the corresponding column headers by decrementing i until a non-numeric/non-date-like cell $d_{i'j}$ is found.

Fifth: Similarly, for each $d_{ij}$ object, find the corresponding row headers by decrementing j until a non-numeric/non-date-like cell $d_{ij'}$ is found.

Sixth: The tuple ($d_{i'j}$, $d_{ij'}$) is considered a potential set of header cells for $d_{ij}$. In Table 3 above, the tuple for the cell with value "2,187" will contain values ("Consolidated statements of income (USD $ in Million)→9 Months Ended Sep. 30, 2020→Actual" and "Consolidated statements of income (USD S in Million)→Revenue→IB fees").

Period Normalization: This module processes the headers assigned to each content cell, and separates the headers expressing periods from those expressing metrics. In an exemplary embodiment, this may be performed with the help of the dateparser python library, which is able to identify date-like expressions in text. As an example, by inspecting each segment in the header "Consolidated statements of income (USD $ in Million)→9 Months Ended→Sep. 30, 2020→Actual", the module is able to determine that only "9 Months Ended" and "Sep. 30, 2020" contain expressions of dates or periods. The remaining segments are merged with the other header in the tuple, "Consolidated statements of income (USD $ in Million)→Revenue→fees".

After deduplication, the other header is updated "Consolidated statements of income (USD $ in Million)→Revenue→IB fees→Actual".

As illustrated in Table 3, the two segments determined as date-like are merged to form "9 Months Ended Sep. 30, 2020". The period normalizer includes a sophisticated set of heuristics implemented by using a rules engine provided by a python library known as spaCy to normalize the period and determine the start and end dates, i.e. $p_{ij}=(ps_{ij}, pe_{ij})$.

Metric Normalization: After the period-like headers are removed, the metric normalization module only has to perform a simple cleanup task. The hierarchy of metrics provided by the remaining headers may contain some signal about the nature of the data. For instance, "Consolidated statements of income (USD $ in Million)→Revenue→IB fees→Actual" indicates that the data is currency ("USD $"), expressed in millions ("Million"), and reflects actual values ("Actual"). In an exemplary embodiment, the metric normalizer uses these signals to determine the type, scale, and designation of each value, i.e. $c_{ij}=(ct_{ij}, cs_{ij}, cg_{ij})$. The remaining language in the headers is considered the hierarchy of metrics, i.e. $m_{ij}=[m^1_{ij}\rightarrow m^2_{ij}\rightarrow \ldots m^k_{ij}]$ and the raw value of the datapoint is considered as $v_{ij}$.

At this point, all of the datapoints described above in the Problem Statement section have been determined. Using the hjoin and vjoin operations described in the Problem Statement section, the metric normalizer further generates derived insights such as calculating percentage shares for datapoints that share the same metric-hierarchy, or calculating period-on-period change rates for datapoints that only differ in their periods by one unit or step.

The resulting panel can be presented in a comma or tab-delimited format, or in a more flexible structure, such as a JavaScript Object Notation (JSON) object.

Figure 6:
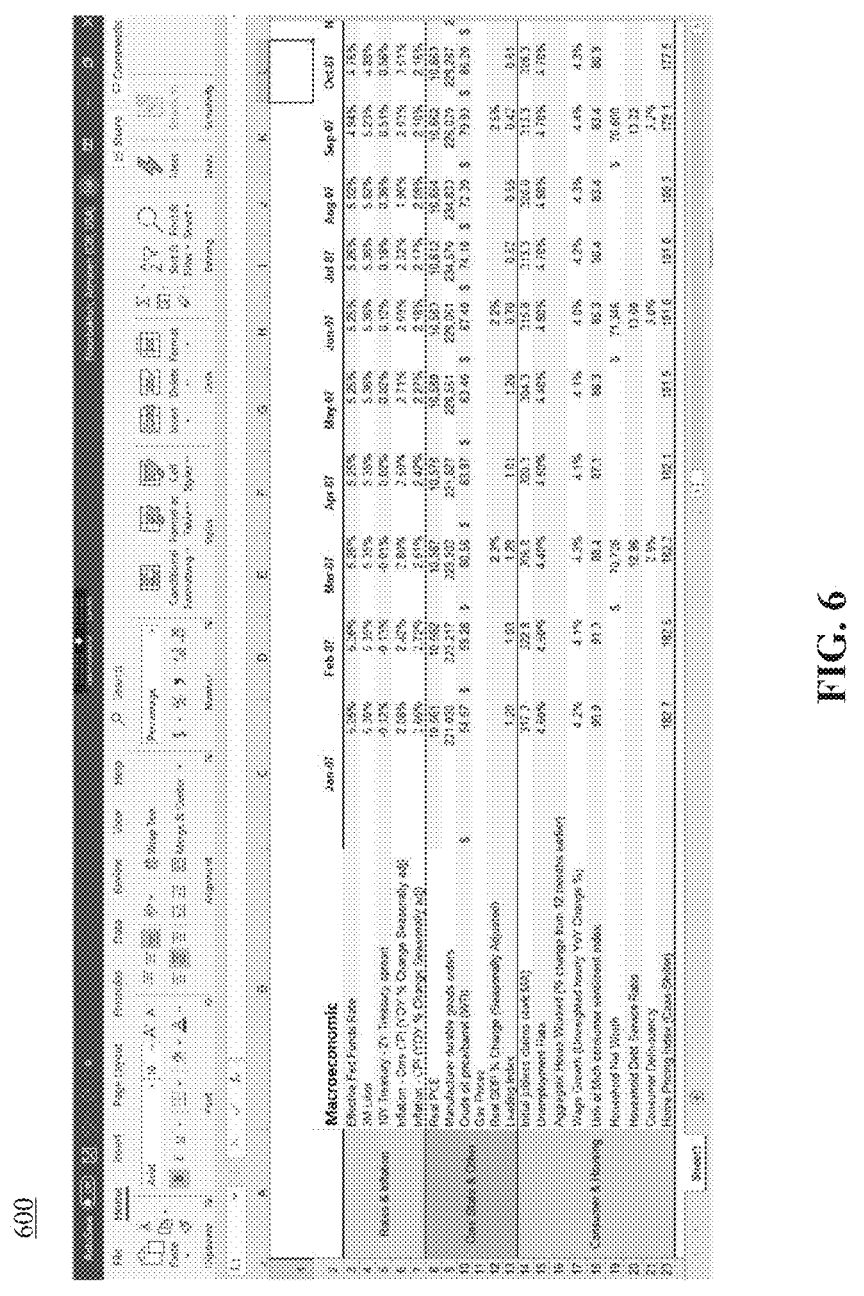

FIG. 6 is a screenshot 600 of a user interface showing an example of spreadsheet data being inputted for processing using a method for automated extraction of financial time-series data from a semi-structured tabular input and conversion of the data into a unified standard format, according to an exemplary embodiment. As illustrated in FIG. 6, an input may include a spreadsheet file that has contained tabular data.

Figure 7:
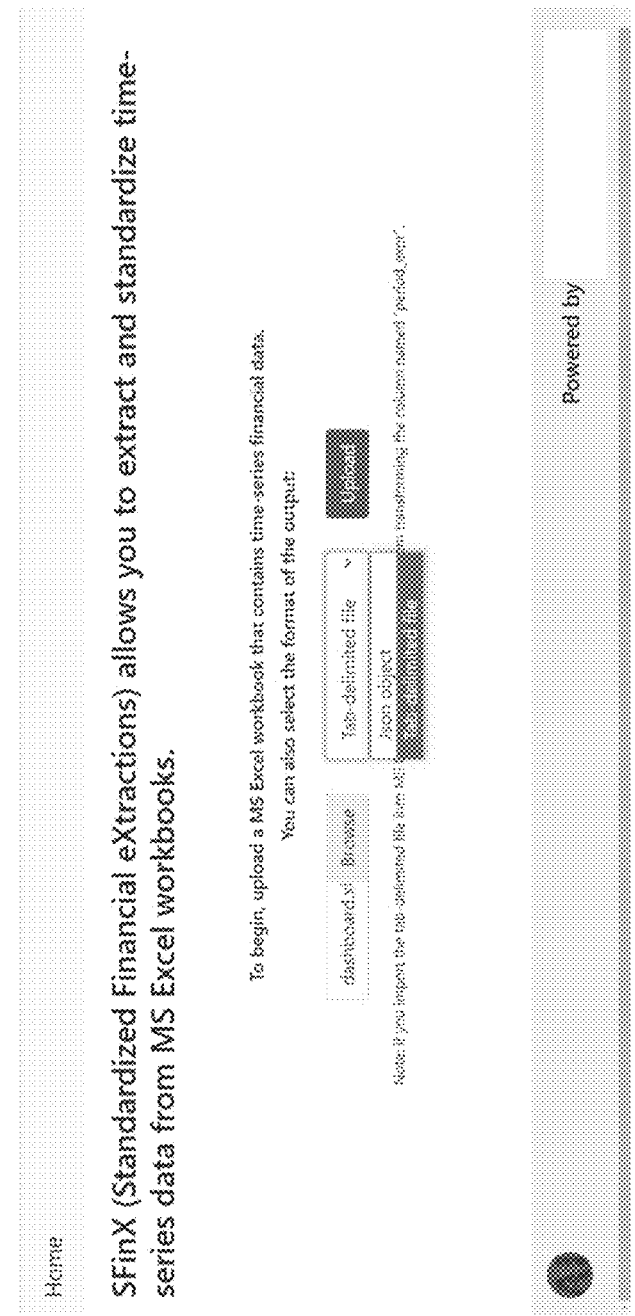
FIG. 7 is a screenshot of the user interface showing an example of user-selectable functions for processing input spreadsheet data, according to an exemplary embodiment.

FIG. 7 is a screenshot 700 of the user interface showing an example of user-selectable functions for processing input spreadsheet data, according to an exemplary embodiment. As illustrated in FIG. 7, a user may upload the spreadsheet to the user interface and then choose an option for the output report, i.e., either a JSON object or a tab-delimited file.

Figure 8:
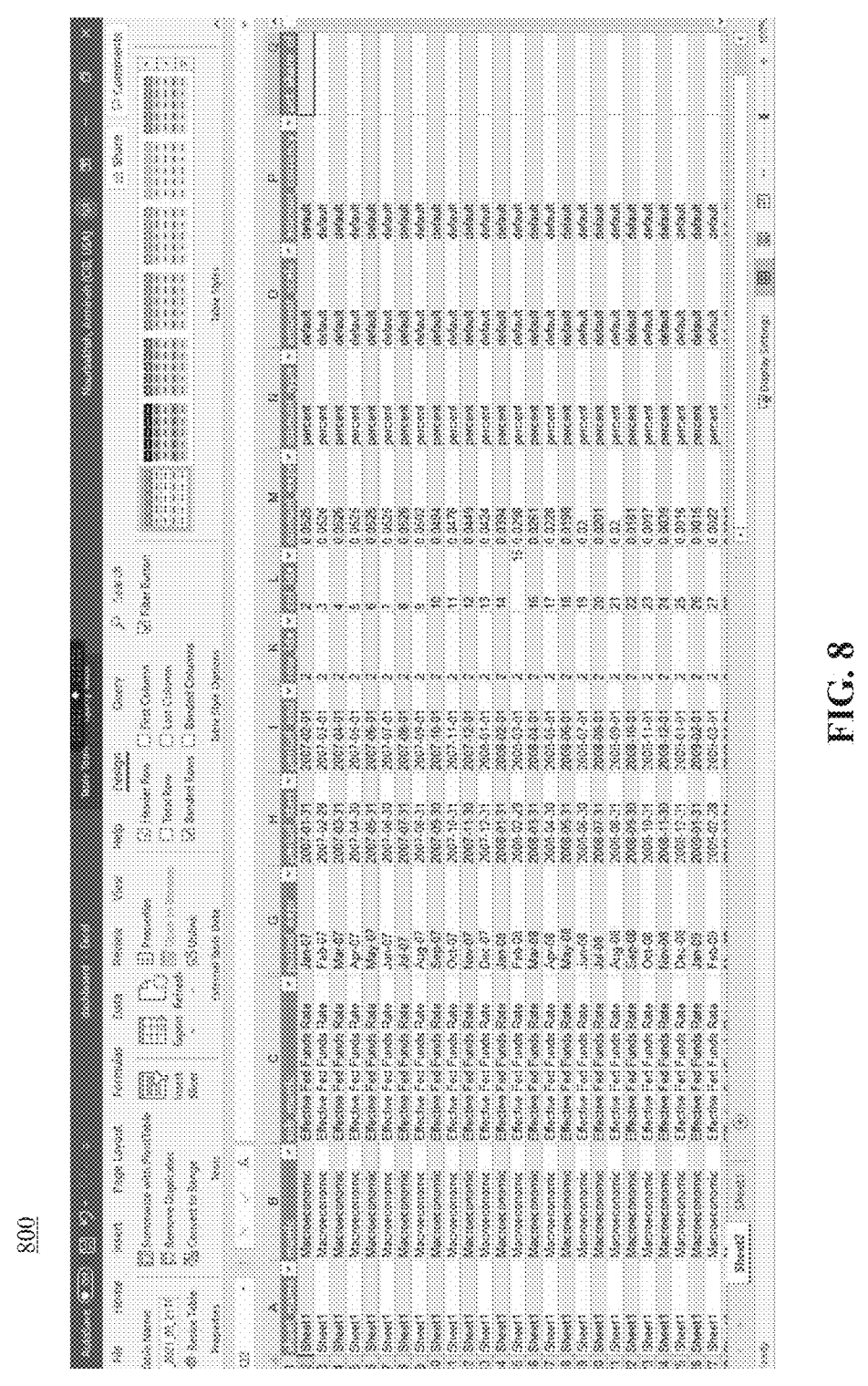

FIG. 8 is a screenshot 800 of the user interface showing an example of an tab-delimited file as an output generated by using a method for automated extraction of financial time-series data from a semi-structured tabular input and conversion of the data into a unified standard format, according to an exemplary embodiment. As illustrated in FIG. 8, a tab-delimited file may be generated as an output after processing of the input spreadsheet shown in FIG. 6 has been completed.

Accordingly, with this technology, an optimized process for automated extraction of financial time-series data from a semi-structured tabular input and conversion of the data into a unified standard format is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive, One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for extracting and formatting financial time-series data, the method being implemented by at least one processor, the method comprising:
   receiving, by the at least one processor, a first set of tabular data;
   automatically segmenting, by the at least one processor, the first set of tabular data into a plurality of cells;
   automatically determining, by the at least one processor for each respective cell of the plurality of cells, whether the respective cell is a header cell or a content cell;
   for each respective cell determined to be a header cell, normalizing each of a time period and a metric associated with the respective header cell;
   for each respective cell determined to be a content cell, automatically determining, from among the plurality of cells determined to be header cells, at least one column header cell and at least one row header cell associated with the respective content cell; and
   automatically generating an output table based on a result of the determining of the corresponding at least one column header cell and the corresponding at least one row header cell associated with each respective content cell.

2. The method of claim 1, wherein the determining of whether the respective cell is a header cell or a content cell comprises:
   when the respective cell contains at least one from among text and date information, determining that the respective cell is a header cell; and
   when the respective cell contains only numerical information, determining that the respective cell is a content cell.

3. The method of claim 1, wherein the normalizing of the time period associated with the respective header cell comprises determining a starting date and an ending date associated with the respective header cell.

4. The method of claim 3, wherein the determining of the starting date and the ending date associated with the respective header cell comprises using a dateparser python library to identify at least one date-like expression contained in the respective header cell.

5. The method of claim 1, wherein the normalizing of the metric associated with the respective header cell comprises determining at least one from among a value type, a value scale, and a value designation for each numerical value associated with the respective header cell.

6. The method of claim 5, wherein the value type includes at least one from among a currency, a percentage, a ratio, a scaled number, a scale-free cardinal number, and a scale-free ordinal number.

7. The method of claim 5, wherein the value scale includes order of magnitude information that corresponds to each numerical value associated with the respective header cell.

8. The method of claim 5, wherein the value designation includes descriptive information that corresponds to each numerical value associated with the respective header cell.

9. The method of claim 1, wherein the first set of tabular data includes at least one from among a Microsoft Excel workbook file that contains at least one spreadsheet, a comma-delimited tabular file, and a tab-delimited tabular file.

10. The method of claim 1, wherein the generating of the output table comprises at least one from among generating a tab-delimited file and generating a JavaScript Object Notation (JSON) object.

11. The method of claim 1, further comprising determining, for each respective content cell, a corresponding hierarchy of metrics.

12. A computing apparatus for extracting and formatting financial time-series data, the computing apparatus comprising:
   a processor;
   a memory; and
   a communication interface coupled to each of the processor and the memory,
   wherein the processor is configured to:
      receive, via the communication interface, a first set of tabular data;
      automatically segment the first set of tabular data into a plurality of cells;
      automatically determine, for each respective cell of the plurality of cells, whether the respective cell is a header cell or a content cell;
      for each respective cell determined to be a header cell, normalize each of a time period and a metric associated with the respective header cell;
      for each respective cell determined to be a content cell, automatically determine, from among the plurality of cells determined to be header cells, at least one column header cell and at least one row header cell associated with the respective content cell; and
      automatically generate an output table based on a result of the determining of the corresponding at least one column header cell and the corresponding at least one row header cell associated with each respective content cell.

13. The computing apparatus of claim 12, wherein the processor is further configured to:
   when the respective cell contains at least one from among text and date information, determine that the respective cell is a header cell; and
   when the respective cell contains only numerical information, determine that the respective cell is a content cell.

14. The computing apparatus of claim 12, wherein the processor is further configured to normalize the time period associated with the respective header cell by determining a starting date and an ending date associated with the respective header cell.

15. The computing apparatus of claim 14, wherein the processor is further configured to determine the starting date and the ending date associated with the respective header cell by using a dateparser python library to identify at least one date-like expression contained in the respective header cell.

16. The computing apparatus of claim 12, wherein the processor is further configured to normalize the metric associated with the respective header cell by determining at least one from among a value type, a value scale, and a value designation for each numerical value associated with the respective header cell.

17. The computing apparatus of claim 16, wherein the value type includes at least one from among a currency, a percentage, a ratio, a scaled number, a scale-free cardinal number, and a scale-free ordinal number.

18. The computing apparatus of claim 16, wherein the value scale includes order of magnitude information that corresponds to each numerical value associated with the respective header cell.

19. The computing apparatus of claim 16, wherein the value designation includes descriptive information that corresponds to each numerical value associated with the respective header cell.

20. The computing apparatus of claim 12, wherein the first set of tabular data includes at least one from among a Microsoft Excel workbook file that contains at least one spreadsheet, a comma-delimited tabular file, and a tab-delimited tabular file.

21. The computing apparatus of claim 12, wherein the processor is further configured to generate at least one from among a tab-delimited file and a JavaScript Object Notation (JSON) object as the output table.

22. The computing apparatus of claim 12, wherein the processor is further configured to determine, for each respective content cell, a corresponding hierarchy of metrics.

\* \* \* \* \*